March 29, 1938.  W. B. MARSHALL  2,112,630
VALVE
Filed Sept. 11, 1935

Inventor
William B. Marshall,
Barker + Collings
Attorneys

Patented Mar. 29, 1938

2,112,630

UNITED STATES PATENT OFFICE 2,112,630

VALVE

William B. Marshall, Milwaukee, Wis., assignor to Chain Belt Company, Milwaukee, Wis., a corporation of Wisconsin Application September 11, 1935, Serial No. 40,134

7 Claims. (Cl. 251—123)

This invention relates to valves and more particularly to check valves of the flap type and has for its general object the improvement of the construction of this type of valve whereby its life may be considerably increased.

A further object of the invention is to provide a flap check valve in which the valve member may be constructed in whole or in part of rubber, leather, or other similar resilient or flexible material, which member is provided with a portion arranged to flex or serve as a hinge whereby the valve may open and close, and the construction being such that the flexing or hinging action takes place over a distributed area rather than being localized at a single point, whereby the wear and tear on the flexing portion may be reduced and the life thereof materially lengthened.

With the above and other objects in view which will appear as the description proceeds, the invention consists in the novel details of construction and combinations of parts more fully hereinafter described and particularly pointed out in the appended claims.

Figure 1:
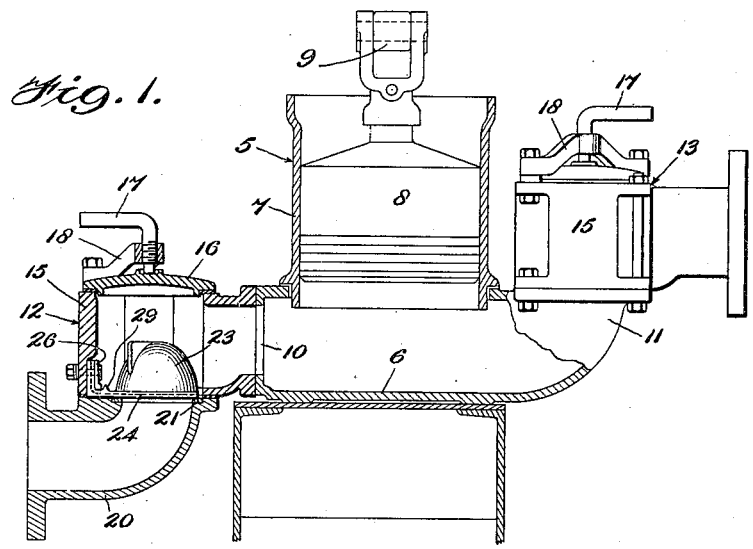
Figure 2:
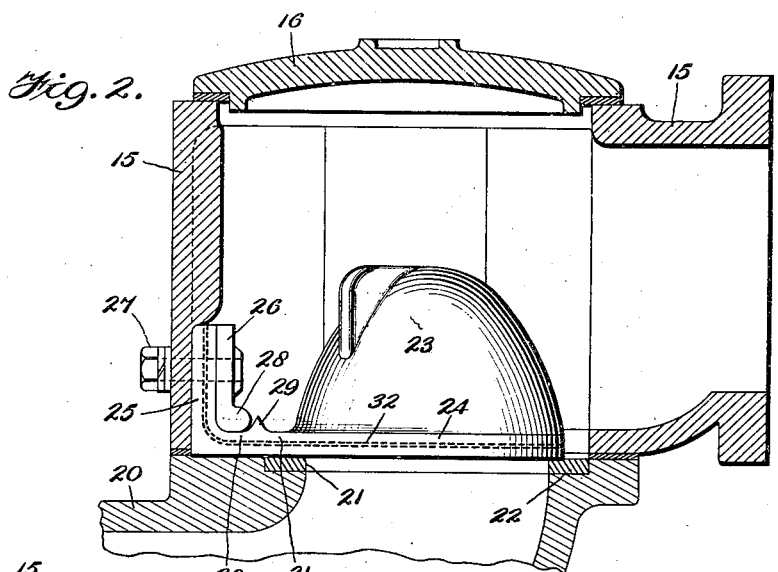
Figure 3:
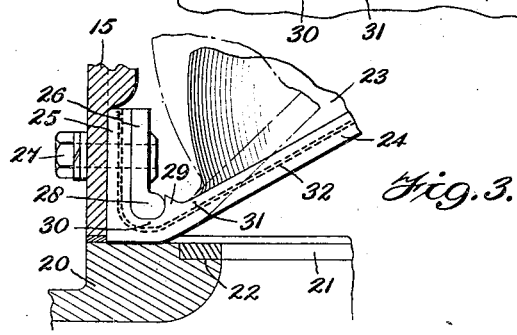

Referring more particularly to the accompanying drawing forming a part of this specification, in which like reference characters designate like parts in all the views, Fig. 1 is a longitudinal sectional elevational view through a well-known type of plunger pump, illustrating valves constructed in accordance with the present invention, serving as the inlet and outlet valves of the said pump;

Fig. 2 is an enlarged vertical sectional view through one of the said valves, showing the same in closed position, and Fig. 3 is a fragmentary sectional elevational view illustrating the valve member in two positions which it assumes in its opening and closing movements.

For purposes of disclosure only, the valves have been here shown in connection with a pump, but it will be readily understood by those skilled in the art that they may be employed in any other relationships where flap check valves are necessary or desirable. In said drawing, 5 indicates generally a pressure pump of the plunger type which is widely used in the pumping of liquids embodying large percentages of solids and commonly known as sludge pumps, which pump may comprise a base member 6 surmounted by a cylinder 7 in which a plunger 8 is arranged to be reciprocated by means of a pitman, walking beam, or other suitable actuator 9. The base member 6 is provided with an inlet 10 and an outlet 11, to which are respectively connected the inlet and outlet valves 12 and 13.

As best shown in Fig. 2, these said valves may comprise a hollow valve casing 15 open at top and bottom, with the upper opening normally closed by a cover 16 retained in position by a threaded clamping member 17 cooperating with a bridge member 18 rigidly secured to the valve casing 15 and spanning the top opening, as will be readily understood from the drawing. When the valve is serving as an outlet valve for a pump of this type, its casing 15 may be secured directly to the outlet conduit 11 of the pump, as shown in Fig 1; and when serving as an inlet valve said casing may have the inlet conduit or manifold 20 secured to its bottom, as is likewise disclosed in said figure. In either case, the member which is secured to the bottom of the valve housing is preferably provided with a seating ring 21, which may be mounted within a recess 22 formed in such member, as is clearly shown in Figures 1 and 2.

The valve member, which is preferably although not necessarily formed of molded rubber, may comprise a bulbous member 23, which may be either hollow or solid, secured to a base member 24, which in the closed position of the valve is adapted to contact the seating ring 21 and co-operate therewith to control the flow. The said base member is extended in one direction and provided with an angularly disposed terminal portion 25 which is adapted to be clamped rigidly against a side wall of the casing 15 by means of a clamping or retaining plate 26, and one or more bolts 27.

The retaining member 26 may be provided with an enlargement 28 at its lower end, which serves as an abutment about which the initial hinging or flexing action of the valve member takes place. The base 24 may be re-inforced by one or more fabric strips 32 molded into it, and the said member is provided adjacent the abutment 28 with a substantially V-shaped up-standing rib 29 which is adapted to co-operate with the said abutment to produce flexing action in the member 24 at a plurality of points instead of having such action localized at a single point. That is to say in the closed position of the valve, the rib 29 is free or spaced from the curved abutment 28, so that as the valve begins its opening movement the initial flexing of the member 24 will take place approximately at the point 30 with the left hand surface of the upstanding ridge 29 being gradually brought into engagement with the curved surface of the abutment 28, as is illustrated in Fig. 3. When the parts reach the position shown in full line in this latter figure, any additional movement of the valve member will occasion flexing at a point 31 intermediate the ridge 29, and the bulbous portion 23 of the valve member, which flexing will continue until the member reaches the broken line position shown in Fig. 3, which is in its fully open position. In this manner, as above stated, the flexing of the material of the base member 24 is distributed over a plurality of points instead of being localized at a single point, and consequently the strain thereon is materially lessened and its life materially increased. The flexings at the points 30 and 31 in the closing movement of the valve produces a rolling action which tends to squeeze out any debris or solid matter which may lodge on the seat under the hinge, thereby insuring that the member 24 will always seat accurately.

When the transverse ridge 29 is in intimate engagement with the abutment 28 as is shown in Fig. 3, it serves as a support to prevent lateral displacement and/or twisting movements of the valve and tends to insure accurate return of the valve member to the seat 21.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What is claimed is:

1. A valve structure comprising a housing, a seat, and a valve member mounted in said housing and having a flexible portion to provide for swinging movements of said valve member to and from said seat, said flexible portion carrying means dividing it into a plurality of non-contiguous substantially uniform flexing areas in which the principal flexing movements of said portion will occur successively.

2. A valve structure comprising a housing, a seat, and a valve member mounted in said housing and having an integral flexible portion providing for swinging movements of said valve member to and from said seat, said flexible portion carrying means arranged to produce non-uniform flexing thereof in adjacent areas, whereby the principal flexing movements of said portion will occur in non-contiguous areas.

3. A valve structure comprising a housing, a seat, a securing member, and a valve member having an integral extension engageable by said securing member to mount the valve member in the housing, said extension having a flexible portion intermediate the securing and valve members to provide for swinging movements of said valve member to and from said seat, said flexible portion also carrying means for inducing non-uniform flexing thereof in adjacent areas, said means being engageable with said securing member to cause the principal flexing movements of said portion to occur in non-contiguous areas successively.

4. In a valve having a housing and a seat, the combination therewith of a valve member having a flexible hinging element, mounted in said housing for swinging movements to and from said seat; means for securing said hinging element to said housing, said means having a portion about which said element may flex during part of the movement of said valve member; and a projection carried by said hinging element, arranged to be brought into engagement with said portion of the securing means when the valve is in intermediate position, and thereby cause flexing of said element at a point removed from said portion during another part of said valve movement.

5. In a valve having a housing and a seat, the combination therewith of a valve member provided with a flexible hinging element, mounted in said housing for coaction with said seat; means for securing said hinging element to said housing, including a member having an abutment about which said element may flex during one portion of the movements of the valve member; and a projection carried by said hinging element, producing non-uniform adjacent flexing areas therein, arranged through engagement with said abutment during a portion of the valve travel to cause said element to flex at a different point during another part of said valve movements.

6. In a valve having a housing and a seat, the combination therewith of an abutment within said housing; and a valve member provided with a flexible hinging portion, mounted in said housing for coaction with said seat, said flexible hinging portion having a reinforcing member dividing it into two spaced hinging areas, said reinforcing member in one position of the valve being disengaged from said abutment, whereby as the valve is moved toward its other position said hinging portion will first flex in one of said hinging areas and cause said reinforcing member to engage said abutment when the valve is in intermediate position, after which said portion will flex in the other of said hinging areas.

7. In a valve having a housing and a seat, the combination therewith of an abutment within said housing; and a valve member provided with a flexible hinging portion, mounted in said housing for coaction with said seat, said hinging portion having a transverse rib dividing it into two spaced hinging areas, said rib in one position of the valve being disengaged from said abutment, whereby as the valve is moved toward its other position said hinging portion will first flex in the area intermediate said abutment and rib and thereby bring said rib into engagement with said abutment, after which said portion will flex in the area on the other side of said rib.

WILLIAM B. MARSHALL.